United States Patent
Kang

[19]

[11] Patent Number: 5,904,467
[45] Date of Patent: May 18, 1999

[54] AUTOMATIC PARTS FEEDING SYSTEM

[75] Inventor: Hyun-Cheol Kang, Kyungsangnam-do, Rep. of Korea

[73] Assignee: Hyundai Motor Company, Seoul, Rep. of Korea

[21] Appl. No.: 08/968,826

[22] Filed: Nov. 13, 1997

[30] Foreign Application Priority Data

Nov. 15, 1996 [KR] Rep. of Korea .................. 96-54455

[51] Int. Cl.⁶ .................................................. B65G 59/06
[52] U.S. Cl. .......................... 414/798; 221/95; 414/797.9
[58] Field of Search .............................. 221/93, 95, 264; 414/797.6, 798, 797.7, 797.9

[56] References Cited

U.S. PATENT DOCUMENTS

| | | | |
|---|---|---|---|
| 1,676,639 | 7/1928 | Elliot et al. .................. | 414/797.9 X |
| 1,760,234 | 5/1930 | Frederick ..................... | 221/95 X |
| 4,497,604 | 2/1985 | Sabatino et al. .............. | 414/797.9 |

FOREIGN PATENT DOCUMENTS 63-87416   4/1988   Japan .................. 414/797.9

*Primary Examiner*—Janice L. Krizek
*Attorney, Agent, or Firm*—Christie, Parker & Hale, LLP

[57] ABSTRACT

An automatic parts feeding system specifically adapted to feed parts having a step difference in shape over any one direction or any one side includes a loading device for receiving parts of this shape. The loading device is located above a base plate having a hole for feeding the parts to a conveyor. A part taking out device located between the loading device and the base plate transfers parts from a bottom of the loading device to the throwing hole, the part taking out device being driven such that it slidably reciprocates between the bottom of the loading device and the throwing hole.

6 Claims, 5 Drawing Sheets

AUTOMATIC PARTS FEEDING SYSTEM

BACKGROUND OF THE INVENTION

The present invention relates to an automatic parts feeding system, and more particularly to an automatic parts feeding system capable of automatically feeding a working part having a step difference in shape over any one direction or any one side of the part.

Heretofore, automatic transfer or automatic feeding of parts was impossible in a case where the parts to be transferred had a step difference in shape over any one direction, such as forward, rearward, rightward or leftward, or any one side of the part, since it was difficult to load and arrange the parts in a loading box, or the like, due to the step difference in the shape of the part. Accordingly, since any process for feeding in such working parts is carried out manually by a fully responsible part throwing-in operator, there is an increasing factor of personnel expenses in the process. Additionally, when the throwing-in operator does not throw-in the part in an automatic line, there has been a problem that operation rate of the line decreases to zero.

SUMMARY OF THE INVENTION

Therefore, the present invention is directed to solve such technical problems as described above, and it is an objective of the present invention to provide an automatic parts feeding device capable of decreasing the required operating man power and improving the operation rate by allowing parts having a step difference in shape over any one direction or any one side of the part to be automatically transferred to a working line, without requiring a separate fully responsible operator for manually feeding the part to a working line.

In order to accomplish the above objectives, the present invention includes: (1) a loading device capable of loading a part to be worked having a step difference in shape over any one direction or any one side of the part in a substantially horizontal state, (2) a part taking out device capable of transferring the parts which are located at a bottom of said loading device, by taking out the parts one by one and transferring them to a throwing hole, (3) a taking out plate driving device capable of reciprocating with predetermined stroke the part taking out device between the bottom of loading device and the throwing hole, (4) a base plate which supports the loading device, the part taking out device and the taking out plate driving device, all of which are positioned above the base plate, the base plate having a throwing hole for feeding the working parts transferred by the part taking out device onto a conveyor system, and (5) a supporting base which supports the base plate, and thus thereby generally supports the whole feeding device, to be placed over the conveyor system.

In accordance with the construction of the present invention described above, a plurality of working parts having a step difference in shape over any one direction or any one side of the part are collectively arranged and loaded into the loading device. The loaded working parts are drawn one by one from the loading device and transferred to a throwing hole of the base plate by the part taking-out device, which is reciprocated between the throwing hole of the base plate and the bottom of the loading device by the taking out plate driving device. The parts are thus automatically dropped onto a conveyor located below the throwing hole, where they are transferred to a desired working line for further processing. Therefore, the working parts having a step difference in shape over any one direction or any one side of the part can be automatically transferred to the working line without requiring a separate fully responsible throwing-in operator. Since the number of part feeding fully responsible operators can be reduced, there is the advantage that personnel expenses can be reduced and operation rates can be improved.

DETAILED DESCRIPTION OF THE INVENTION

Hereinafter, a preferred embodiment of the present invention will be described more in detail with reference to the accompanying drawings.

Figure 2:
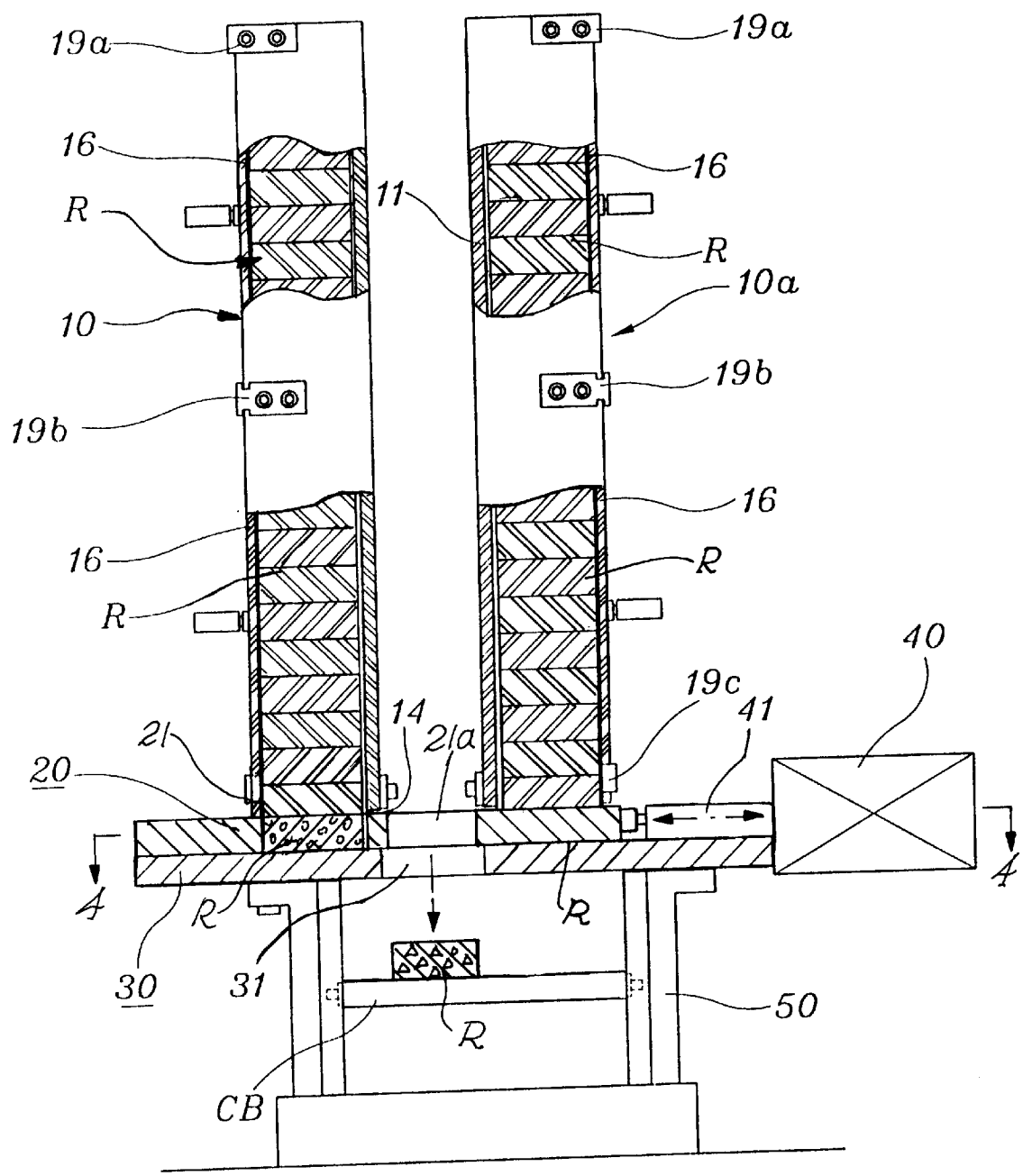
FIG. 2 is a partial cross-sectional view showing the automatic parts feeding system of FIG. 1 in a second loading state.
Figure 5:
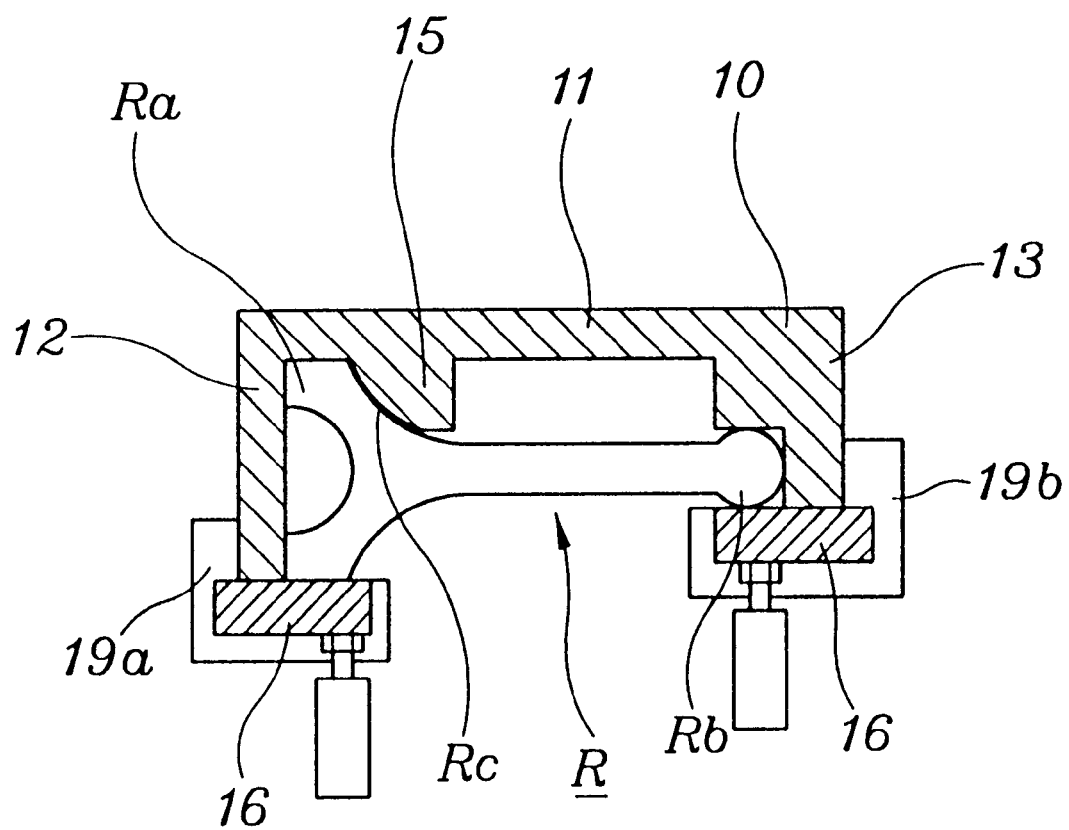
FIG. 5 is a cross sectional view taken along line 5—5 in FIG. 3.

The automatic feeding system of a presently preferred embodiment is for automatically feeding a connecting rod working part R to a working line for working a piston connecting rod of automobiles. The working part R is of a shape which has a substantially Y-figure shape, as shown in FIG. 5, and which has a step difference between a right and left side portions of the part. As seen in FIG. 2, thickness t1 of head portion Ra of the working part is thicker than thickness t2 of pivot portion Rb of the working part.

The automatic feeding system includes a loading device having two loading boxes 10, 10a arranged and loaded with a plurality of connecting rod working parts R. A part taking out device is provided at a bottom of said two loading boxes 10, 10a and has a part taking out transferring plate 20 for taking out the loaded connecting rod working parts R one by one. A taking out plate driving device has an air cylinder 40 for reciprocating said part taking out transferring plate 20 by a predetermined distance to the right and left. A base plate 30 is provided in which said loading boxes 10, 10a are firmly fixed and the part taking out transferring plate 20 is supported, the base plate having a throwing hole 31 through which the connecting rod working parts R taken out of the bottom of the loading boxes by the part taking out transferring plate 20 are thrown onto the conveyor CB one by one. Additionally the system includes a supporting base 50, which fixedly supports the base plate 30, and has a conveyor CB for conveying the connecting rod working parts R thrown to the working line.

The two loading boxes 10, 10a are loaded, by arranging a plurality of above described connecting rod working parts R vertically within the loading boxes. The loading boxes 10, 10a are devices of identical construction, and therefore the construction of only one of the loading boxes 10 will be explained. Loading box 10 is made of a box type enclosure which is opened at a top, a bottom and a right side, and defining a elongate vertical loading space within the interior of the box by a left side plate 11, a front side plate 12, and a rear side plate 13. The loading box has an internal cross sectional shape capable of receiving the connecting rod working part R, along with a plane faced external surface as shown in FIG. 5, and includes a longitudinal guide means 15, having a cross section of a closely circumscribing shape to an exterior surface round portion Rc of the connecting rod working part R, adapted for coming into contact with portion Rc when the connecting rod working part is loaded into the loading box. The guide means 15 maintain the parts in a substantially horizontal state within the loading boxes by means of frictional contact with the exterior surface round portion RC of the parts. The loading box is also formed with fixing flanges 17, 18 for fixing the front plate 12 and rear plate 13 of the loading box, respectively, at a lower end of the loading box. The loading box also includes a transferring plate guide groove 14, extending beyond the interior loading space of the loading box adjacent a lower end of left side plate 11.

Figure 3:
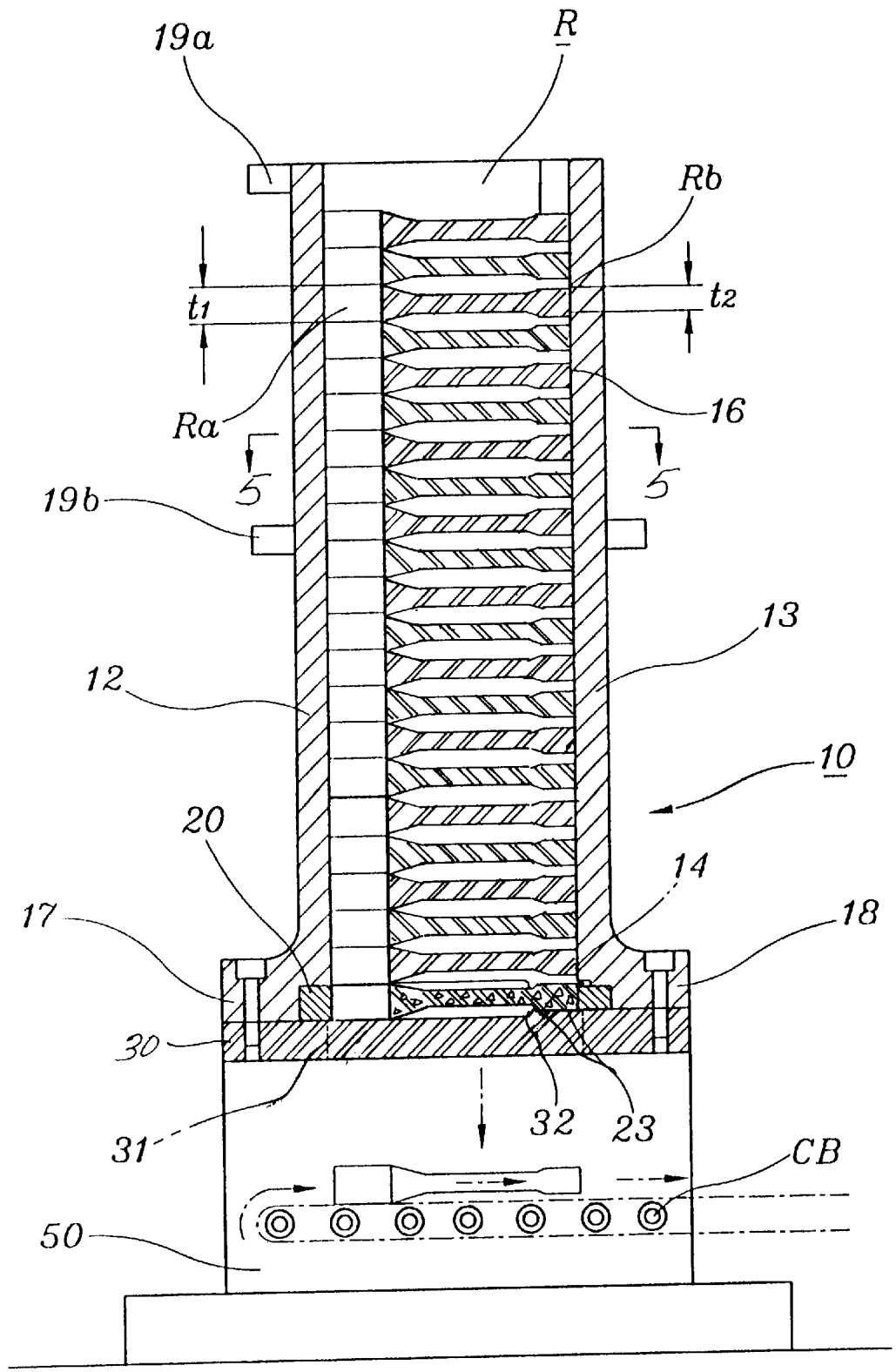
FIG. 3 is a cross sectional view taken along line 3—3 in FIG. 1.
Figure 4:
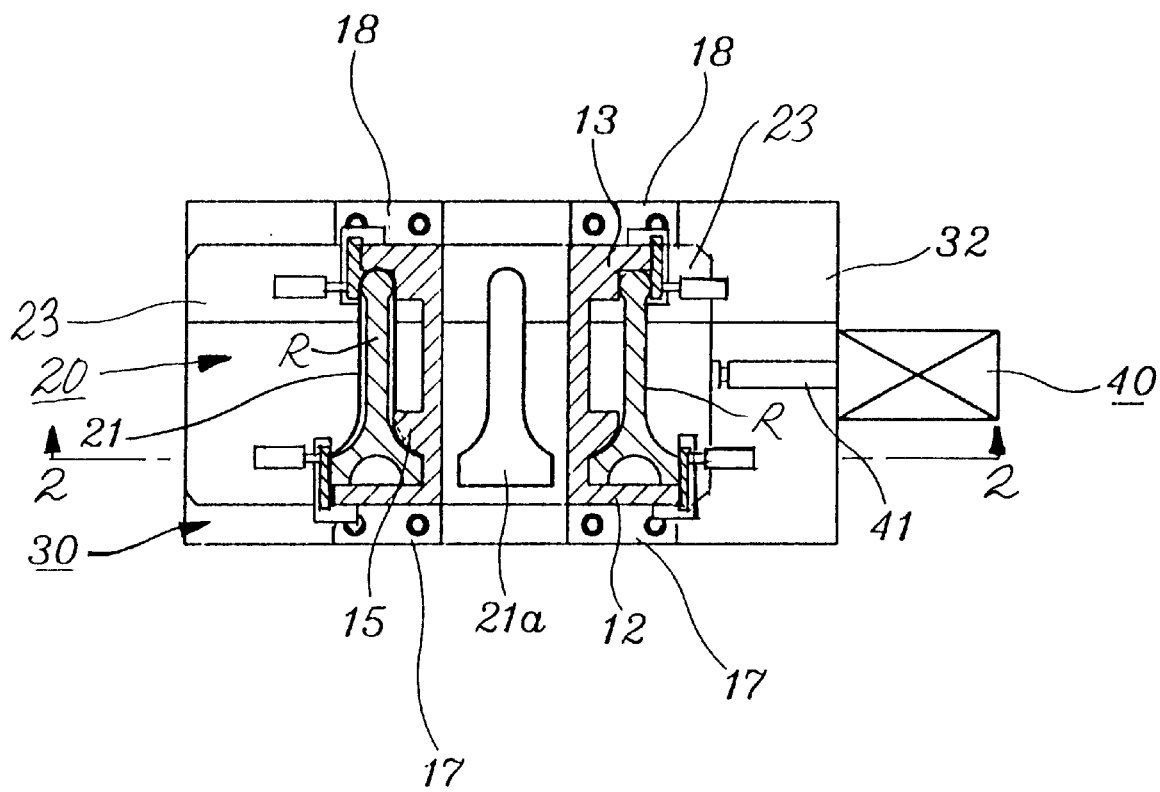
FIG. 4 is a cross sectional view taken along line 4—4 in FIG. 2.

The part taking out transferring plate 20 is laid on the top surface of the base plate 30 and slidably reciprocated thereon. In other words, the part taking out transferring plate 20 is reciprocatingly guided along the top surface of the base plate between the transferring plate guide grooves 14 at the bottom ends of the two loading boxes. The part taking out transferring plate 20 is arranged with two taking out holes 21, 21a of a shape substantially similar to an exterior shape of the connecting rod working parts R, the taking out holes being located a predetermined distance from the ends of the taking out transferring plate 20. A right side end of the part taking out transferring plate is connected with a rod 41 of an air cylinder 40, firmly fixed to the right side end of the baseplate 30. A rear side end of the transferring plate has a stepped rise 23 to accommodate the pivot portion Rb of the connecting rod working part having a thickness less that the head portion Ra of the connecting rod working part. As can be seen from FIG. 3, the combined thickness of the stepped rise 23 and the pivot portion Rb is substantially the same as the thickness of the head portion Ra.

The base plate 30 is fixedly secured to the supporting base 50, and fixes said two loading boxes 10, 10a a predetermined distance apart, and includes a top plane surface adjacent and contacting the bottom surface of the part taking out transferring plate 20 so that the part taking out transferring plate 20 can be slidably reciprocated along the top plane surface. The base plate 30 also includes a protruded stepped rise 32 closely contacting the bottom side stepped rise 23. The stepped rise 32 maintains the parts in a substantially horizontal state once they have been removed from the loading boxes. The base plate also includes a throwing hole 31, of a shape substantially identical to the side taking out holes 21, 21A of the part taking out transferring plate 20.

The air cylinder 40 is a construction which is fixedly provided adjacent a right side of the base plate 30 and includes an operating rod 41 connected to the right side end of the part taking out transferring plate 20. During a first loading state, a right side taking out hole 21a of two taking out holes 21, 21a, formed in the part taking out transferring plate 20, is located adjacent the bottom of the loading space of the right side loading box 10a, such that it is capable of taking out a lowermost one of the connecting rod working ports R loaded in the right side loading box 10a. Simultaneously, a left side taking out hole 21 is positioned such that it is superimposed over the throwing hole 31 of the base plate 30, as an operation starting point. When the air cylinder is actuated and the operating rod 41 is actuated to a second loading state, the left side taking out hole 21 is slid such that it is located adjacent the bottom of the loading space of the loading box 10, and is capable of taking out a lower most one of the connecting rod working raw materials R loaded to the left side loading box 10.

The supporting base 50 supports the entire automatic feeding system described above, and includes a conveyor CB at a center of its interior side, for receiving the connecting rod working raw material R dropped through the throwing hole 31 of the base plate 30 for transferring to the working line side.

Doors 16 are provided in a releasable fashion by top, middle and bottom supporting means 19a, 19b, 19c respectively, from both sides of exterior side surface opened portion of each loading box 10, 10a.

Figure 1:
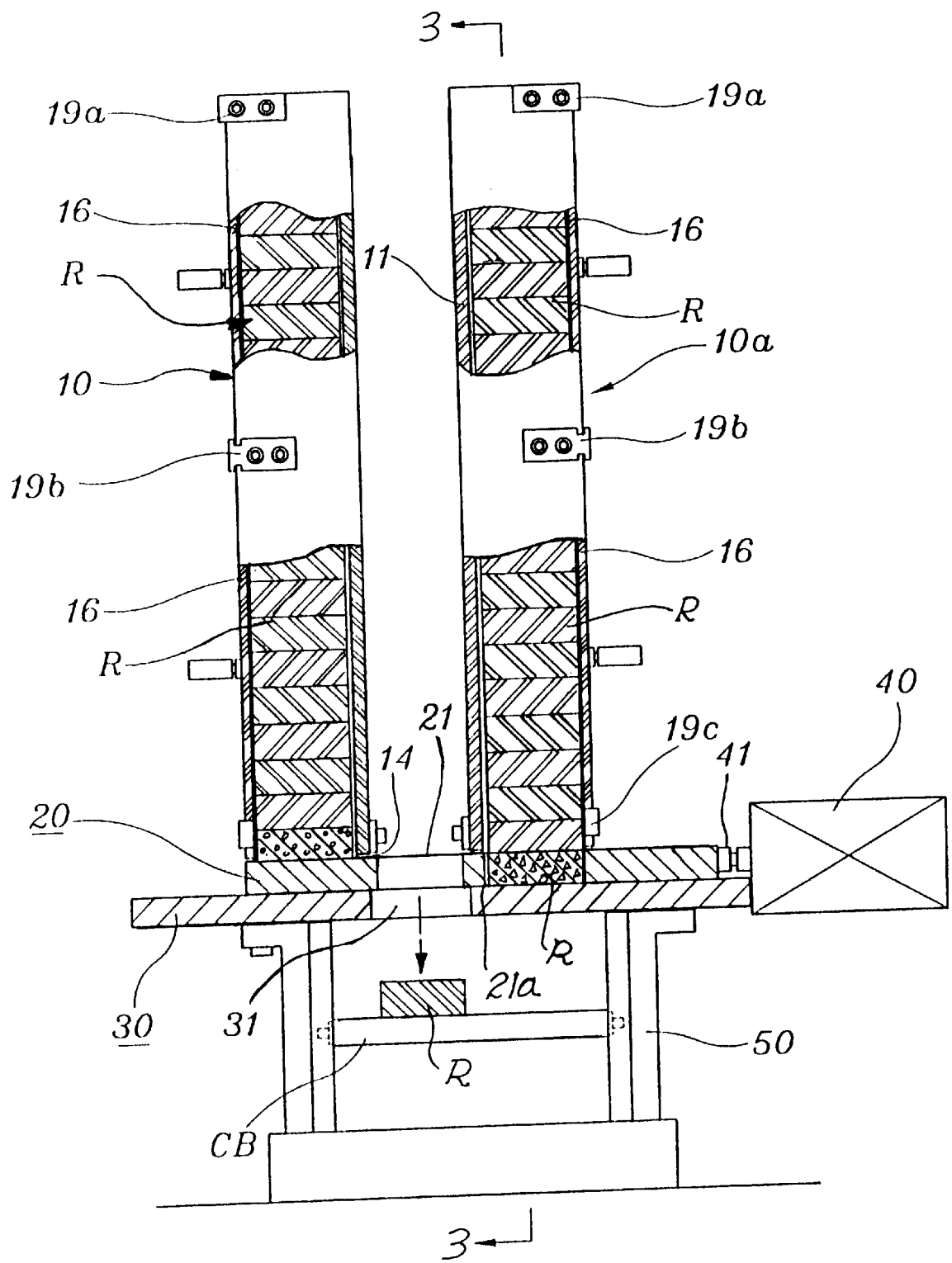
FIG. 1 is a partial cross-sectional view showing the automatic parts feeding system according to the present invention in a first loading state.

In accordance with the construction as above, in a first loading state shown in FIG. 1, the part taking out transferring plate 20 is pulled to the right side by the air cylinder 40, the right side taking out hole 21a is located at the bottom of the loading space of the right side loading box 10a, the left side taking out hole 21 is located such that it is superimposed over the throwing hole 31 of the base plate 30, and the bottom of the left side loading box 10 is effectively closed by the top plane surface of the base plate 30. The connecting rod working parts R are either loaded into the loading space of the interior of the loading boxes from the top of each loading box when the doors 16 are attached to the loading boxes, or alternatively the connecting rod working parts R are loaded into the loading space of the loading boxes from the bottom of the loading boxes when the doors 16 are removed from the loading boxes 10, 10a and then the doors 16 are attached. As illustrated in FIG. 5, each connecting rod working part R is loaded in the loading boxes such that the exterior surface round portion Rc of the head portion Ra is closely contacted to the guide means 15 and loaded in a substantially horizontally arranged state, without a significant inclination between the head portion Ra and pivot portion Rb of the part, even though there is a difference in thickness between these portions.

When a plurality of connecting rod working parts R are respectively loaded in both side loading boxes 10, 10a as described above, the connecting rod working parts positioned at the bottom of the right side loading box 10a is stably guided and received into the right side taking out hole 21a of the part taking out transferring plate 20, located at the bottom of the loading space, by the weight of the working parts loaded in the loading box above it. This is referred to as the primary feeding operation.

When the air cylinder 40 is intermittently controlled for a part transfer, its operating rod 41 pushes the part taking out transferring plate 20 to an opposite left side, and as shown in FIG. 2, the left side taking out hole 21 is located at the bottom of the loading space of the left side loading box 10, and receives a control rod working part R from the bottom of loading box 10. Additionally, the right side taking out hole 21a, with the one connecting rod working part R received in the previous step, moves such that it is superimposed over the throwing hole 31 of the base plate 30.

When the right side taking out hole 21a is superimposed over the throwing hole 31 of the base plate 30, the one connecting rod working part R stably received therein is automatically dropped to a conveyor CB provided below through the throwing hole 31 of the base plate 30, and the dropped connecting rod working part R is therefore automatically moved by the primary feeding operation up to another predetermined working line by the conveyor CB.

When this process is complete, a secondary feeding operation is initiated, and the operating rod 41 of the air cylinder 40 retracts, whereby the part taking out transferring plate 20 is returned to the first loading position shown in FIG. 1, which is an opposite direction different from said second loading condition, by slidably operating the transferring plate. That is, when the operating rod 41 of the air cylinder 40 is pulled in, the part taking out transferring plate 20 is moved from the left side to the right side in the drawings. The right side taking out hole 21a is thus moved again to the bottom of the loading space of the right side loading box 10a and arranged therewith, and the left side taking out hole 21, which received a control rod working part R in the previous step is moved such that it is superposed over the throwing hole 31 of the base plate 30.

When the left side taking out hole 21 is superimposed over the throwing hole 31 of the base plate 30, the connecting rod working part R contained therein is automatically dropped to the conveyor CB provided below, through the throwing hole 31 of the base plate 30, and the dropped connecting rod working part R makes the automatically moved secondary feeding operation up to another working line by a predetermined conveyor CB line.

Subsequently to the primary feeding operation as above, the secondary feeding operation can be controlled by a switch manipulation operating the air cylinder 40 in a working line receiving the connecting rod working parts R, or else can be intermittently or continuously controlled by automatically controlling the air cylinder 40 with keeping a predetermined time difference previously set by considering a working time of primarily fed working parts, and by repeating the primary/secondary working operations as above, the plurality of connecting rod working parts R loaded to each right and left loading boxes 10, 10a can be automatically transferred to a working line by the operation sequentially controlling the operating rod 41 of the air cylinder 40.

The connecting rod working part feeding system of the above described embodiment is offered as a preferred embodiment embodying the present invention and is not necessarily limited thereto.

For instance, although the shape of the loading space and shape of the guide means 15 included in said loading boxes 10, 10a are described in connection with a working part having the shape of the connecting rod working raw material R described above, for other working parts, their shapes may be changed accordingly.

The construction of the loading box is described as two the loading boxes 10, 10a, and two taking out holes 21, 21a formed in the part taking out transferring plate 20, is an embodiment that is considered advantageous for being able to throw by continuously taking out the parts at every one stroke of the air cylinder 40, and simultaneously for operating the feeding system for a long time without replenishment of parts by loading many parts at one time. However, in conformity with characteristics of the parts and of the working line, the present invention may be practiced by changing the construction of the loading box and the construction of the part taking out transferring plate or the shape of the taking out hole or voluntarily decreasing/increasing its number.

As described above, in accordance with the present invention, since automatic feeding is possible in transferring working parts having a step difference over any one side or any one direction in the shape of the part to a working line, the operation rates of the working line can be increased, and the personnel expenditures decreased.

What is claimed is:

1. An automatic parts feeding system comprising:
   a loading device adapted to receive a plurality of parts, each of the plurality of parts having a step difference in shape over any one side of the part and each of the plurality of parts being arranged in the loading device in a substantially horizontal state;
   a base plate below the loading device for supporting the loading device, the base plate comprising a throwing hole for transferring the plurality of parts to a conveyor;
   a part taking out device located between a bottom of the loading device and the base plate, for transferring, one by one, the plurality of parts from the loading device to the throwing hole; and
   a taking out plate driving device for reciprocating the part taking out device between the bottom of the loading device and the throwing hole,
   wherein the loading device comprises two loading boxes, each loading box having a vertical interior loading space for receiving some of the plurality of parts,
   wherein the part taking out device comprises a part taking out transferring plate reciprocatingly provided between a bottom of the loading boxes and the base plate, the transferring plate having two taking out holes for receiving and transferring, one by one, the plurality of parts from the bottom of the loading boxes to the throwing hole, and
   wherein the taking out plate driving device comprises an air cylinder coupled to the part taking out transferring plate for reciprocating the transferring plate along the base plate such that when one of the taking out holes is substantially aligned with the bottom of one of the loading boxes, the other taking out hole is substantially aligned with the throwing hole.

2. The automatic parts feeding system as defined in claim 1 wherein the vertical interior loading space of each of the loading boxes includes means for maintaining the plurality of parts in a substantially horizontal state.

3. An automatic part feeding system comprising:
   a conveyor;
   a plurality of loading devices, each loading device having a vertical elongate loading space for receiving a plurality of parts, each of the plurality of parts having at one end relative to an opposite end, a step difference in shape;
   a base plate above the conveyor for supporting the plurality of loading devices, the base plate comprising a throwing hole for feeding the parts to the conveyor;
   a part taking out device, below the plurality of loading devices and supported on the base plate, for transferring, one by one, the plurality of parts from the loading devices to the throwing hole; and
   a part taking out driving device for slidably reciprocating the part taking out device between the throwing hole and a bottom of the loading spaces of the plurality of loading devices,
   wherein each of the plurality of parts is received in a respective loading device in a substantially horizontal state,
   wherein the part taking out device comprises a part transferring plate having a plurality of taking out holes of a shape substantially similar to a shape of each of the plurality of parts,
   wherein the plurality of loading devices comprises two loading devices,
   wherein the part transferring plate is reciprocatingly provided between a bottom of the plurality of loading devices and the base plate, and wherein the part transferring plate comprises two taking out holes for receiving and transferring, one by one, the plurality of parts from the bottom of the loading devices to the throwing hole, and wherein the taking out holes are positioned in the part transferring plate such that when one of the taking out holes is substantially aligned with the bottom of one of the loading devices, the other taking out hole is substantially aligned with the throwing hole.

4. The automatic part feeding system according to claim 3 wherein each of the vertical elongate loading spaces includes means for maintaining the plurality of parts in a substantially horizontal state.

5. The automatic part feeding system according to claim 3 wherein the part taking out driving device comprises an air cylinder coupled to the part transferring plate.

6. The automatic part feeding system according to claim 3 wherein the base plate includes a stepped rise for maintaining the plurality of parts in a horizontal state when removed from the loading devices.

* * * * *